May 24, 1927.
T. C. GRAHAM
1,630,082
PLANT AND FLOWER MODELING OUTFIT
Original Filed May 20, 1925    2 Sheets-Sheet 1
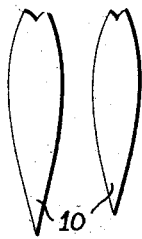
Fig. 1
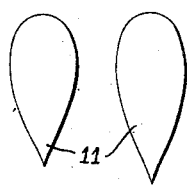
Fig. 2
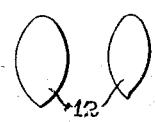
Fig. 3
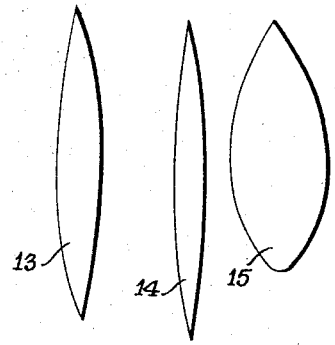
Fig. 4
Fig. 5
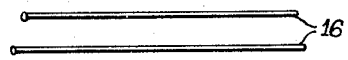
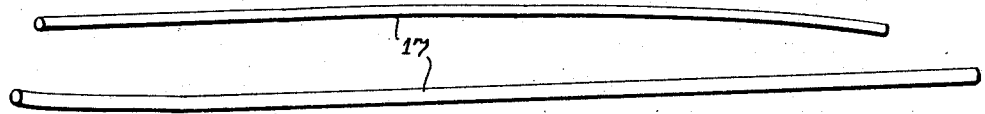
Fig. 6
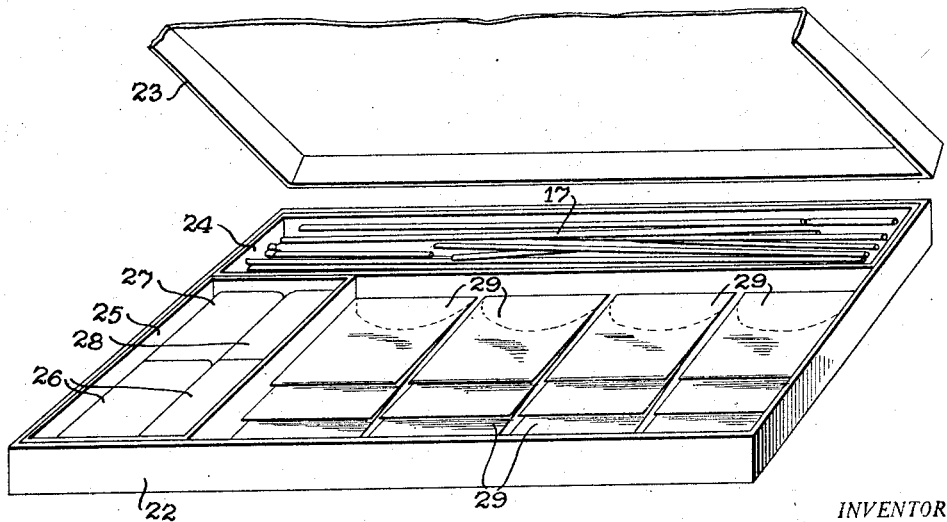
INVENTOR.
Tom C. Graham.
BY Cooper, Kerr & Dunham
ATTORNEYS.

May 24, 1927. 1,630,082
T. C. GRAHAM
PLANT AND FLOWER MODELING OUTFIT
Original Filed May 20, 1925   2 Sheets-Sheet 2
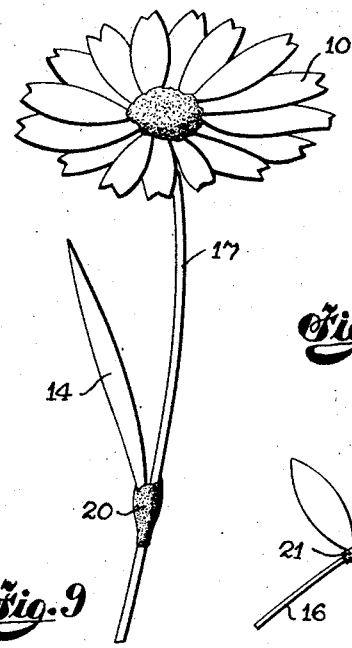
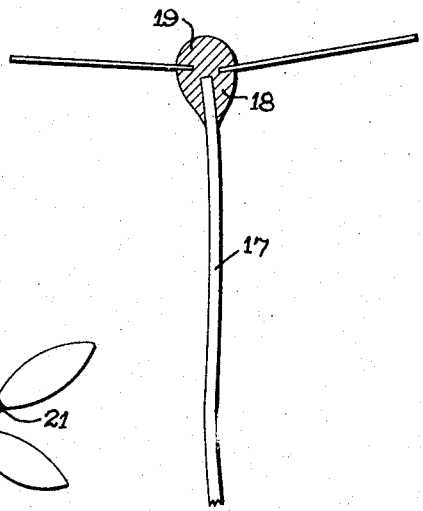
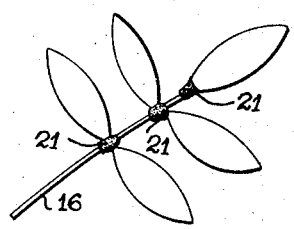
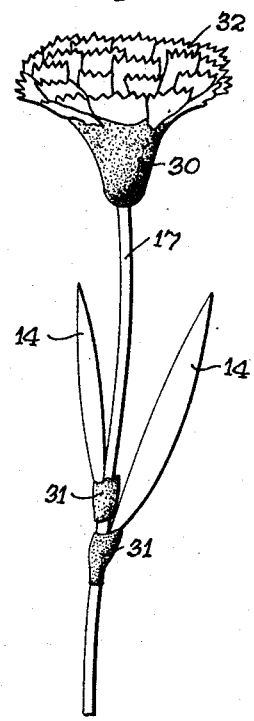
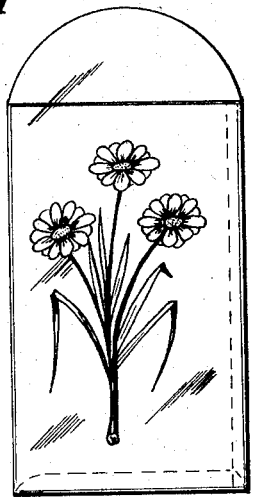
INVENTOR.
Tom C. Graham.
BY
Cooper, Kerr & Dunham
ATTORNEYS.

Patented May 24, 1927.

1,630,082

UNITED STATES PATENT OFFICE.

TOM C. GRAHAM, OF ALBANY, NEW YORK, ASSIGNOR TO THE EMBOSSING COMPANY, OF ALBANY, NEW YORK, A CORPORATION OF NEW YORK.

PLANT AND FLOWER MODELING OUTFIT.

Application filed May 20, 1925, Serial No. 31,585. Renewed April 12, 1927.

The chief object of this invention is to provide an outfit of materials for use of children, as an educational toy, with which the child can make models of plants or flowers, preferably life size and in shapes and colors closely resembling nature so that the benefits derived from use of the toy will not be limited to practice in manual dexterity or skill but will also include encouragement in the habit of observation with a view to closer copying of natural flowers. In carrying out the invention in the preferred manner I provide a supply of petals of various shapes, sizes and colors, simulating selected flowers, as for example the common daisy, marigold, and zinnia; a supply of leaves, suitably colored and shaped; a supply of stems; and a supply of plastic modeling material in various colors, preferably material which will not stain the skin and which remains plastic indefinitely, as for example the material extensively sold under the name "Everedy", which is specially advantageous by reason of its permanent plasticity and power of adhesion. For more permanent models, sealing wax or other material capable of hardening can be used. The leaves, petals and stems may be made of any suitable material. For example the leaves and petals may be made of light wood or stiff cardboard, and for some flowers the seeds of certain plants, as the cantaloupe, watermelon, pumpkin and squash, may be used. The stems may be thin, more or less cylindrical strips of cane, bamboo, or rattan, these materials having slight flexibility and at the same time sufficient strength to withstand repeated use. Natural twigs, branches, or the stems of living plants may be used for the same purpose in making the models.

Referring to the accompanying drawings, Figs. 1, 2 and 3 are plan views showing various shapes usable as petals.

Fig. 4 shows several leaves of different shapes.

Fig. 5 shows several stems.

Fig. 6 is a perspective view showing the preferred outfit as put up for the market.

Fig. 7 is a perspective view of a flower made of the parts provided in the present outfit.

Fig. 8 is a sectional view of the flower shown in Fig. 7.

Fig. 9 is a view showing a model of a carnation.

Fig. 9ᵃ shows one of the petals used in the model illustrated in Fig. 9.

Fig. 10 shows a leaf form of the rose type.

Fig. 11 shows one of the envelope containers for parts provided in the outfit illustrated in Fig. 6.

The petals shown in Figs. 1, 2 and 3 resemble in shape those of the daisy, zinnia, and marigold, respectively, and may be suitably colored. For example those at 10, Fig. 1, may be white or orange, to suit the common field daisy or the variety known as "Black-eyed Susan". Those shown at 11, Fig. 2, may be colored red, yellow, or any other color or shade suitable for making zinnias. The petals shown at 12, Fig. 3, are seeds and may also be colored, as for example an orange shade for making marigolds. The leaves shown at 13, 14, 15, in Fig. 4, are of course colored green, preferably in such shade or shades as may be most suitable for the particular flowers which can be made with the outfit, as are also the stems shown at 16, 17, in Fig. 5.

A daisy made with the parts shown is illustrated in Fig. 7, using petals 10, stem 17, and leaf 14. In making this flower (see Fig. 8) a "head" is formed, which may consist of a small mass 18 of green plastic material shaped to the form of a calyx at the end of the stem, and on the calyx a small body 19 of yellow modeling material, which is rounded with the fingers to resemble the center of the flower, is mounted. The resemblance can be enhanced by stippling this center with a pin or other sharp instrument, as will be readily understood. The pointed ends of a suitable number of petals are now thrust into the flower-head, along the plane of division between the two parts 18, 19, to form the corolla of the flower, after which a leaf 14 may be affixed to the stem, as in Fig. 7, by means of a small bit of modeling material 20, molded around the stem and end of the leaf with the fingers.

Fig. 9 illustrates a model of a carnation, composed of a head or calyx 30, stem 17, leaves 14 held on the stem by plastic modeling material 31, and petals 32, which may be of the shape shown in Fig. 9ᵃ, colored white, pink, or red.

By using one of the short thin stems 16, Fig. 5, and leaves 15, Fig. 4, a leaf-form of the type shown in Fig. 10 may be made, fastening the leaves to the stem by means of modeling material at 21.

As stated above, the leaves and petals are preferably made of thin pieces of wood, which may be about one thirty-second of an inch thick with the grain running lengthwise of the leaf or petal, and the stems are preferably made of thin strips of rattan. These materials are sufficiently absorbent to be readily colored by dipping. Any suitable dyes or stains may be used for the latter purpose, preferably stains or dyes which are not soluble in water so as to prevent discoloring the fingers in handling the articles. Stiff cardboard may be used for the leaves and petals, but such material is not preferred, since it is apt to lose its stiffness and also because it creases easily, thereby rendering the article virtually useless. Thin, light sheet metal, as for example tinplate or aluminum, may be employed, and offers certain advantages, as for example the capability of bending without breaking, thereby enabling the leaves and petals to be shaped to a closer resemblance to nature. On the other hand, thin sheets of basswood, beech, or maple, are extremely light in weight, tough enough to suffer considerable bending, both with and against the grain, without splitting or breaking, and when so bent their "springiness" causes them to resume their original shape after release.

The "modeling material" is preferably of the permanently plastic or non-drying type, since it permits the flower models to be readily disassembled for re-use of the parts at any time, and also because material capable of hardening by drying, as is the case with ordinary modeling clay, changes its consistency with age unless kept in airtight containers. But my invention contemplates the use of such material if desired, or a material like sealing wax, which requires slight heating to make it plastic, as for example for making flower models of a more permanent character. In general, however, flower models made with the "Everedy" material (mentioned hereinbefore) for securing the parts together will hold their form indefinitely if not disturbed by rough handling.

The modeling material, stems, and other desired plant or flower elements, are preferably put up as illustrated in Fig. 6. The shallow rectangular box 22, having a lid 23, is provided along one side with a tray or compartment 24 containing stems, and at one end with a tray or compartment 25 containing a supply of the plastic modeling material in suitable colors, as for example two slabs 26 of green material, one of yellow, 27, and one of brown, 28. These may be wrapped individually to prevent contaminating each other by handling when the outfit is exposed for sale. The remaining space in the box is devoted to petals and leaves, which may be enclosed in envelopes, as 29. The envelopes, preferably made of tough transparent or semi-transparent paper, can be laid loosely in the box or they can be fastened to the bottom by adhesive to prevent them from jumbling about in shipment and handling. The envelopes can be readily detached for access to their contents.

The inside of the lid may be utilized to display printed and pictorial instructions (not shown) for using the outfit, and the envelopes may bear pictures, preferably in colors, of the flowers which can be made with the parts enclosed; as in Fig. 10, for example, which shows an envelope bearing a picture of a cluster of flowers.

With an outfit such as described a large variety of flower and plant models can be made. Its use makes a deeper impress on the child's mind than can be ordinarily produced by drawing pictures, and it is in harmony with modern principles of education, which emphasize the employment of the child's hands as the most effective method of training the powers of observation and perception.

It is to be understood that the invention is not limited to the details herein specifically described but can be embodied in other forms without departure from its spirit. While the invention has been designed primarily for children's use as a toy or educational article it can be used for more serious purposes, providing a means of making artificial flowers and foliage for decorative and other purposes.

I claim—

1. An outfit for making plant models, comprising a plurality of plant elements of light relatively stiff material, and permanently plastic modeling material for securing the plant elements together in simulation of nature and permitting disassembly of the plant elements for re-use.

2. An outfit for making plant models, comprising a plurality of petals and stems of relatively stiff light material, and permanently plastic modeling material for securing the petals to the stems and permitting disassembly of the petals and stems for re-use.

3. An outfit for making plant models, comprising a plurality of petals, leaves and stems of light relatively stiff material, shaped and colored to simulate the corresponding parts of natural flowers, and suitably colored permanently plastic modeling material for securing the aforesaid parts together and permitting disassembly of the petals, leaves and stems for re-use.

4. An outfit for making plant models, comprising a plurality of petals and leaves made of thin pieces of wood, shaped in a plurality of forms and stained in a plurality of colors to simulate the petals and leaves of natural flowers, thin colored strips of wood for use as stems, and permanently plastic modeling material in a plurality of colors for securing leaves to the stems and for shaping to the form of calyxes and flower-centers for attachment of petals to the stems and permitting disassembly for re-use of the non-plastic parts.

In testimony whereof I hereto affix my signature.

TOM C. GRAHAM.